No. 756,349. PATENTED APR. 5, 1904.
L. A. FRAYER.
TRANSMISSION GEAR.
APPLICATION FILED AUG. 17, 1903.
NO MODEL. 2 SHEETS—SHEET 1.
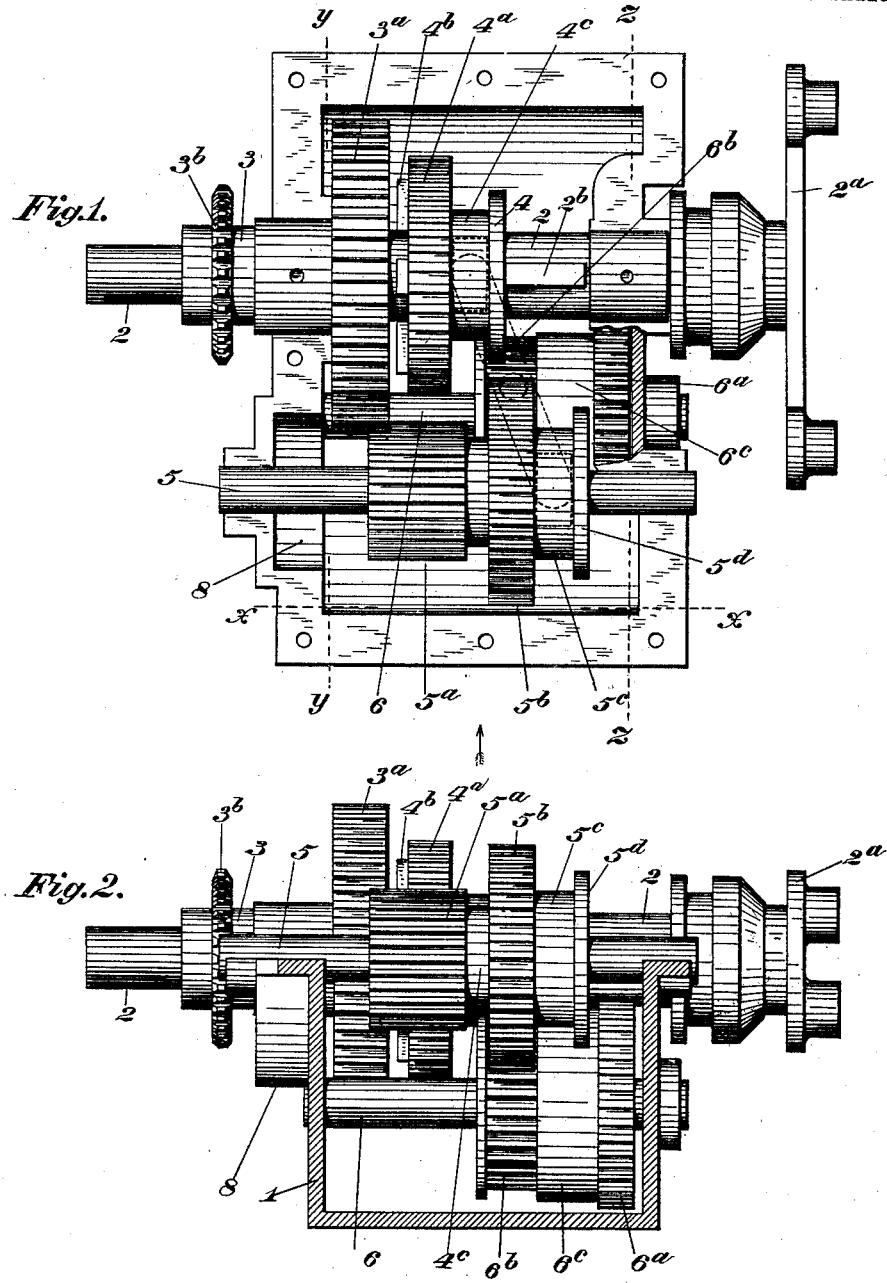
Witnesses
Benj. Finckel
R. J. Finckel.
Inventor
Lee Ambrose Frayer
by Finckel & Finckel
his Attorneys No. 756,349. PATENTED APR. 5, 1904.
L. A. FRAYER.
TRANSMISSION GEAR.
APPLICATION FILED AUG. 17, 1903.
NO MODEL. 2 SHEETS—SHEET 2.
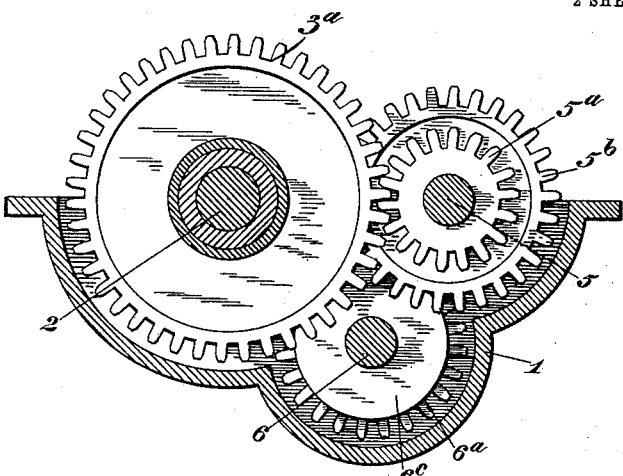
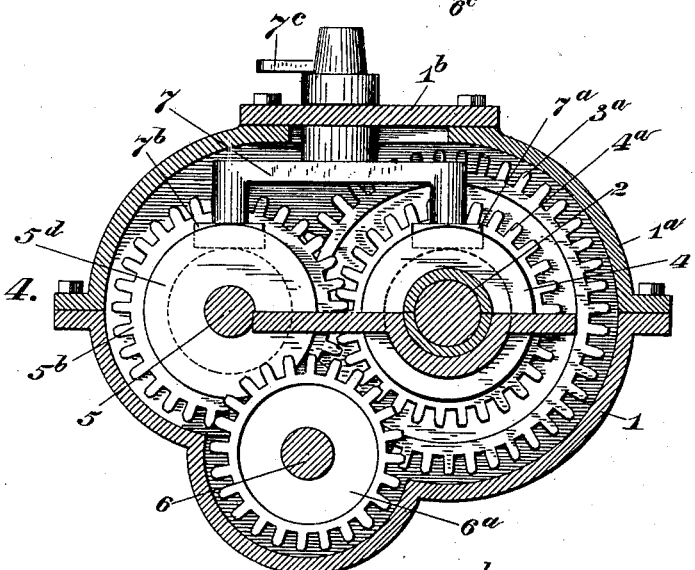
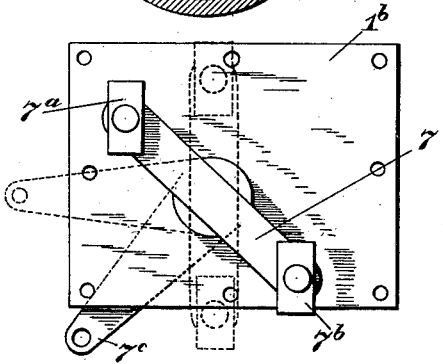
Witnesses
Benj. Finckel
R. J. Finckel
Inventor
Lee Ambrose Frayer
By Finckel & Finckel
his Attorneys No. 756,349. Patented April 5, 1904.

UNITED STATES PATENT OFFICE.

LEE AMBROSE FRAYER, OF COLUMBUS, OHIO, ASSIGNOR, BY MESNE ASSIGNMENTS, TO THE OSCAR LEAR AUTOMOBILE COMPANY, OF COLUMBUS, OHIO, A CORPORATION OF OHIO.

TRANSMISSION-GEAR.

SPECIFICATION forming part of Letters Patent No. 756,349, dated April 5, 1904.

Application filed August 17, 1903. Serial No. 169,751. (No model.)

*To all whom it may concern:*

Be it known that I, LEE AMBROSE FRAYER, a citizen of the United States, residing at Columbus, in the county of Franklin and State of Ohio, have invented certain new and useful Improvements in Transmission-Gear; and I do hereby declare the following to be a full, clear, and exact description of the invention, such as will enable others skilled in the art to which it appertains to make and use the same.

The object of this invention is to provide a transmission-gearing of simple and economical construction and in which the main driving-gear in its high-speed position may be disengaged from the other speed-changing gears and the transmission device, therefore, operate with a little or no noise. The gearing is especially designed for use on automobiles and will include, besides the high-speed arrangement, means for reducing the speed and for reversing the direction of motion of transmitting-gear; but the invention will be useful in any place where power is to be transmitted and controlled in a similar way.

In the accompanying drawings, in which I have illustrated an embodiment of the invention, Figure 1 is a plan view of the gearing, the upper part of the casing being removed to display the parts and the means for shifting the gears being illustrated by broken lines. Fig. 2 is an elevation of the gearing, the casing being in section on the plane $x\ x$, Fig. 1, and the view taken looking in the direction indicated by the arrow, Fig. 1. Fig. 3 is a view in elevation of the left-hand side of the gearing shown in Fig. 1, the shifting yoke being omitted and the casing being in section on the line $y\ y$, Fig. 1. Fig. 4 is a similar view looking at the right-hand side of the gearing, Fig. 1, the casing being in section on the line $z\ z$, Fig. 1. Fig. 5 is a view of the under side of the cover of the casing, showing the shifting yoke.

The casing proper is made of two sections 1 and $1^a$, bolted together.

2 designates the driving-shaft, having a crank $2^a$, to which the motive power or engine is connected in any appropriate manner.

3 designates a sleeve loose on the shaft 2 and having formed therewith or fixed thereon a large gear-wheel $3^a$ and also a sprocket-wheel $3^b$, conveying power through the medium of a chain to the axle or other place desired.

4 designates a grooved clutching-sleeve on the shaft 2, containing a gear $4^a$ of smaller diameter than the gear-wheel $3^a$ and having on its face appropriate clutching-teeth $4^b$, adapted to engage corresponding depressions (not shown) on the side of the gear-wheel $3^a$. The clutching-sleeve 4 is slidingly fitted on an enlarged portion of the shaft 2, but is always rotated with said shaft by the engagement of a feather $2^b$, extending longitudinally on the shaft. The clutching-sleeve also has a groove $4^c$ to receive a shifting block, as hereinafter described.

5 designates another shaft journaled parallel to the shaft 2, and on said shaft 5 is slidingly fitted a sleeve $5^d$, containing a laterally-elongated pinion $5^a$, adapted to mesh with the gear $3^a$, and a gear $5^b$ of larger diameter than the pinion $5^a$, but adapted when brought into the plane of the gear $4^a$ to mesh therewith. This sleeve is also made with a groove $5^c$ to be engaged by a shifting block, as hereinafter described.

Journaled in the casing below the two shafts 2 and 5 is another shaft 6, on which is slidingly fitted a sleeve $6^c$, containing a projecting toothed gear $6^a$, adapted to mesh with the gear $4^a$ when the two are brought into the same plane, and a gear $6^b$, sunk below the surface of the sleeve $6^c$ and engaged by the gear $5^b$. Whenever the sleeve bearing the gear $5^b$ is shifted, the sleeve bearing the sunken gear $6^b$ and the gear $6^a$ is shifted with it.

Journaled at the under side of a removable cap or cover $1^b$, bolted to the casing proper, is a yoke-arm 7, bearing two pivoted shifting blocks $7^a$ and $7^b$. The block $7^a$ engages the groove of the sleeve on the driven shaft 2, and the block $7^b$ engages the groove on the sleeve of the shaft 5. The stem of the yoke projects up through the plate $1^b$ and is provided with a crank-arm $7^c$, to which may be attached an appropriate rod for moving the yoke. When the yoke is rocked, the sleeves 4 and $5^d$ are shifted simultaneously in contrary directions.

The operation is as follows: The shaft 2 will be driven with a constant motion. In the position of the parts shown in Fig. 1 the shaft runs free—that is, without rotating the sprocket $3^b$ in one direction or the other. When the clutching-sleeve 4 is shifted by the yoke 7 to clutch the gear $3^a$, the sprocket will be driven with the same speed as the shaft. This will in propelling a vehicle be the forward high speed of the gearing. In this position the pinion $5^a$ is disengaged from the gear $3^a$. When the sleeves 4 and $5^d$ are shifted until the gears $4^a$ and $5^b$ are engaged, the sprocket will be driven in the same direction as that first described but with a slow speed, because the motion will be communicated from the driven shaft to the sprocket through the pinion $5^a$, which is of small diameter as compared with the gear $3^a$. When the sleeves 4 and $5^d$ are after this further shifted until the gear $4^a$ engages the gear $6^a$ on the shaft 6, the sprocket $3^b$ will be driven with a slow speed in the reverse or backward direction, because the sunken gear $6^b$ of the sleeve $6^c$ will then drive the pinion $5^a$ in the opposite direction, the motion of the shaft not being directly communicated to the pinion $5^a$, but indirectly through the sleeve $6^c$ to the gear $3^a$ and clutch $3^b$. The gears $5^b$ and $6^a$ are so placed with respect to each other and with respect to the gear $3^a$ and by reason of the yoke 7 they are so operated that there is an interval between each of the speeds when the gear $4^a$ will run without operating the gear $3^a$ and sprocket. For example, between the slow forward and the slow backward operations the gear $4^a$ will run free in the space made between the gears $5^b$ and $6^a$, and between the slow forward and the fast forward the gear $5^b$ and $3^a$ will run free between the gear $5^b$ and gear $3^a$. This latter position is indicated in Fig. 1. The elongated gear $5^a$ serves as the transmitting medium for both the slow forward and the slow backward operations, and to afford room for the requisite shifting of this gear the casing is made with a recess in its side, as indicated at 8.

In some uses of the invention, as in machinery, the power could be transmitted directly from the large gear $3^a$ instead of by means of a sprocket-chain from the sprocket-wheel $3^b$.

Where I use characters of reference in my claims appended hereto, I do not do so for the purpose of limiting myself to the forms of parts shown and described, but merely for the purpose of enabling the reader to readily locate the elements intended, it being obvious that the forms and proportions of all the parts can be varied without departing from the essence of the invention.

Should no reverse motion be needed in a special application of the invention the lower or intermediate shaft 6 and its gears can be omitted, and, further, instead of making the parts $5^d$ and $6^c$ as sleeves to turn on their respective shafts they can be made fast to said shafts and the shafts themselves, together with those parts, made longitudinally shiftable.

What I claim, and desire to secure by Letters Patent, is—

1. In a transmission-gearing, the combination of a driving-shaft, a power-transmitting gear loose thereon, a sliding clutch-sleeve on said shaft and rotating therewith to engage said gear, said sliding clutch-sleeve also having a gear, a second shaft containing sliding gears $5^a$ and $5^b$ and means for shifting said sleeve and the sliding gears simultaneously in opposite directions.

2. In a transmission-gearing the combination of a driving-shaft, a power-transmitting gear loose thereon, a sliding clutch-sleeve on said shaft to engage said gear, said sliding clutch-sleeve rotating with said shaft, and also having a gear, a second shaft, sliding gears $5^a$ and $5^b$ thereon, and a yoke engaging said sliding sleeve and the gears $5^a$ and $5^b$ for shifting said sleeves and the gears simultaneously in opposite directions.

3. In a transmission-gearing, the combination of a driving-shaft, a power-transmitting gear loose thereon, a sliding clutch-sleeve on said shaft to engage said gear, said sliding clutch-sleeve rotating with said shaft, and also having a gear, a second shaft containing sliding gears $5^a$ and $5^b$, means for shifting said sleeve and the gears $5^a$ and $5^b$ simultaneously in opposite directions, a third shaft containing sliding gears $6^a$ and $6^b$ said last-named gears being connected with the gears $5^a$ and $5^b$ on the second-named shaft to be slidable simultaneously therewith.

4. In a transmission-gearing, the combination of a driving-shaft, a power-transmitting gear $3^a$ turning loose thereon, a sliding clutch-sleeve on said shaft to engage said gear, said sliding clutch-sleeve rotating with said shaft and also having a gear $4^a$, a second shaft, sliding gears $5^a$ and $5^b$ thereon to engage the gears $3^a$ and $4^a$ respectively, means for shifting said sleeve and the gears $5^a$ and $5^b$ simultaneously in opposite directions, a third shaft containing sliding gears $6^a$ and $6^b$, the gear $6^a$ being adapted to be brought temporarily into engagement with the gear $4^a$ and the gear $6^b$ being continuously engaged with the gear $5^b$.

5. In a transmission-gearing, the combination of a driving-shaft, a power-transmitting gear $3^a$ loose thereon, a sliding clutch-sleeve having a gear $4^a$ on said shaft and rotating therewith, a second shaft containing sliding gears $5^a$ and $5^b$, the gear $5^a$ adapted to mesh with the gear $3^a$, and the gear $5^b$ adapted to mesh with the gear $4^a$, and means for simultaneously shifting in opposite directions the gear $5^a$ out of mesh with the power-transmitting gear $3^a$ and the clutch-sleeve into engagement with said gear and for shifting the gear $5^a$ into mesh with the gear $3^a$ and the gear $5^b$ into mesh with the gear $4^a$.

6. In a transmission-gearing, the combination of a driving-shaft, a power-transmitting gear $3^a$ loose thereon, a sliding clutch-sleeve having a gear $4^a$ on said shaft and rotating therewith, a second shaft containing sliding gears $5^a$ and $5^b$, the gear $5^a$ adapted to mesh with the gear $3^a$ and the gear $5^b$ adapted to mesh with the gear $4^a$, means for simultaneously shifting the gear $5^a$ out of mesh with the power-transmitting gear $3^a$ and the clutch-sleeve into engagement with said gear and for shifting the gear $5^a$ into mesh with the gear $3^a$ and the gear $5^b$ into mesh with the gear $4^a$, and a third shaft containing sliding gears $6^a$ and $6^b$, the gear $6^b$ meshing with the gear $5^b$ and the gear $6^a$ adapted to mesh with the gear $4^a$ both said gears $6^a$ and $6^b$ being connected with the gear $5^a$ on the second-named shaft and slidable therewith.

In testimony whereof I affix my signature in presence of two witnesses.

LEE AMBROSE FRAYER.

Witnesses:
    BENJ. FINCKEL,
    S. W. LATHAM.